US006686555B2

(12) United States Patent
Bayer et al.

(10) Patent No.: US 6,686,555 B2
(45) Date of Patent: Feb. 3, 2004

(54) METHOD FOR PLASMA JET WELDING

(75) Inventors: Erwin Bayer, Dachau (DE); Stefan Laure, Stuttgart (DE); Jürgen Steinwandel, Uhldingen-Mühlhofen (DE)

(73) Assignees: MTU Aero Engines GmbH, Munich (DE); DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/219,818

(22) Filed: Aug. 16, 2002

(65) Prior Publication Data

US 2003/0052097 A1 Mar. 20, 2003

(30) Foreign Application Priority Data

Aug. 16, 2001 (DE) ........................................ 101 40 298

(51) Int. Cl.$^7$ ................................................ B23K 10/00

(52) U.S. Cl. ............................ 219/121.46; 219/121.47; 219/76.16; 219/121.52; 315/111.51; 427/446; 427/569

(58) Field of Search ....................... 219/121.52, 121.48, 219/121.5, 121.51, 74, 75, 121.46, 121.47, 76.15, 76.16, 121.59; 313/231.31, 231.41; 315/111.51; 427/562, 564, 571, 575, 569, 446

(56) References Cited

U.S. PATENT DOCUMENTS

| | | | | | |
|---|---|---|---|---|---|
| 4,982,067 | A | * | 1/1991 | Marantz et al. | 219/121.47 |
| 5,285,046 | A | * | 2/1994 | Hansz | 219/121.47 |
| 5,453,305 | A | * | 9/1995 | Lee | 219/121.41 |
| 5,486,674 | A | * | 1/1996 | Lynum et al. | 219/121.52 |
| 5,560,844 | A | * | 10/1996 | Boulos et al. | 219/121.59 |

* cited by examiner

*Primary Examiner*—Mark Paschall
(74) *Attorney, Agent, or Firm*—Crowell & Moring LLP

(57) ABSTRACT

A method for plasma jet welding by means of a free radio frequency-induced plasma beam wherein, the rf-induced plasma beam is generated by a procedure involving a second process gas into a tube so that it has a tangential flow component and the introduction of the plasma through a metal expansion jet at the outlet.

20 Claims, 1 Drawing Sheet

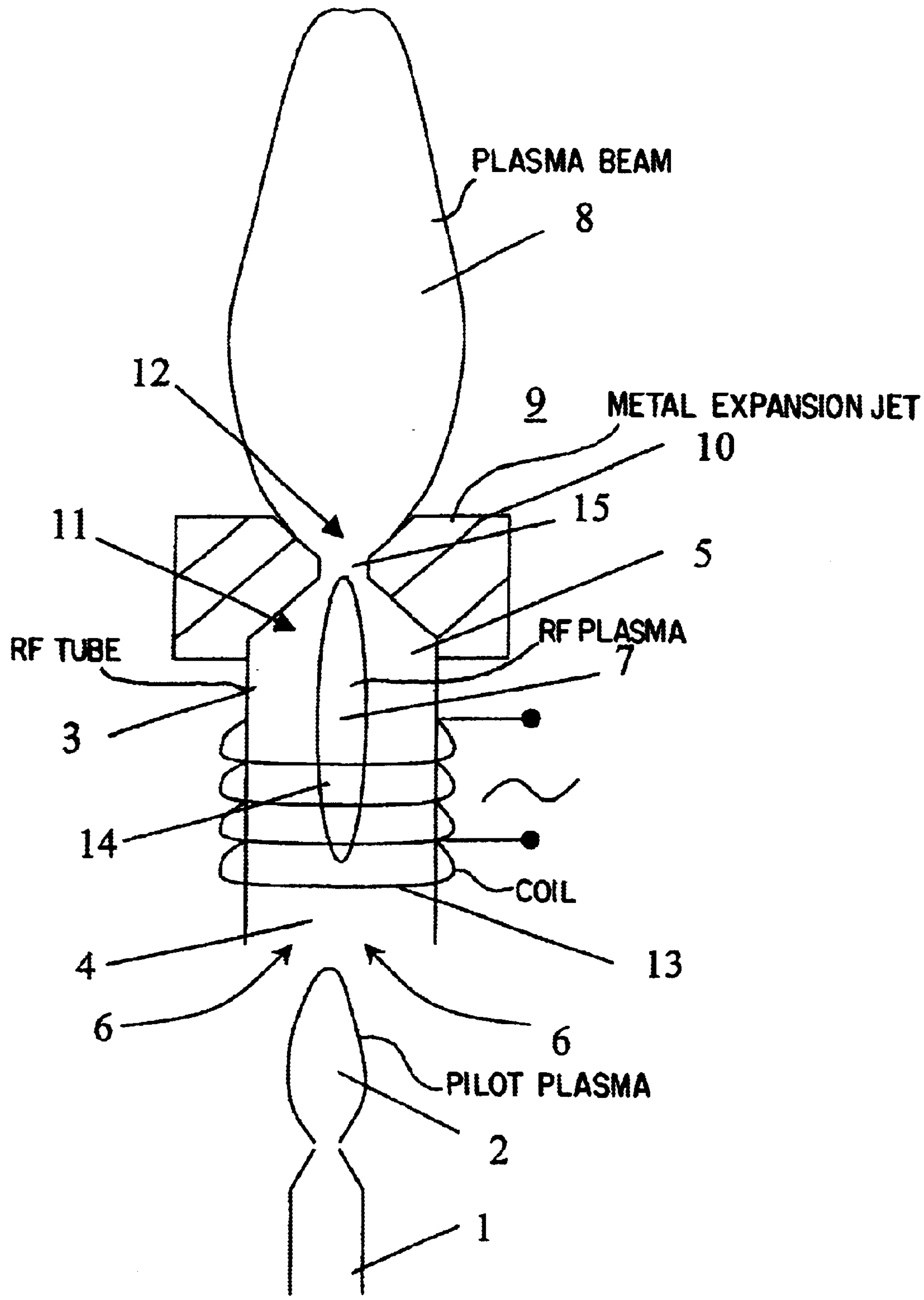
Fig.

METHOD FOR PLASMA JET WELDING

This application claims the priority of German Application No. 101 40 298.8-34, filed Aug. 16, 2001, the disclosure of which is expressly incorporated by reference herein.

BACKGROUND AND SUMMARY OF THE INVENTION

The invention relates to a method for plasma jet welding.

In recent years, a variety of efforts have been undertaken to particularly increase and refine the performance capacity of conventional plasma jet welding processes, such as tungsten inert gas welding (TIG) or active-gas metal arc welding (MAG).

In TIG welding, an electric arc burns between a non-melting tungsten electrode and the subject, so that the subject is melted open. The electric arc has an angle of divergence of about 45°. This means that the distance between the TIG welding torch and the subject significantly affects the power density, which on the whole is relatively low. Due to the high heat conductivity of the metals, a substantial portion of the heat escapes into the area surrounding the weld seam. A power level that is limited by the life of the electrode and the resulting limited electric arc output leads to relatively slow welding speeds.

The plasma beam can be restricted in various plasma jet welding processes by means of water-cooled expansion jets. This can reduce electric arc divergence to about 10° (visual). As a result, a higher power density and, at identical electric arc power, a resulting faster welding speed can be achieved when working with technically conventional distances between the plasma welding torch and the subject. In addition, the more stable and less divergent plasma beam, as compared with the conventional TIG process, reduces the impact of the welding parameters on the shape of the electric arc.

If significantly more energy is applied to the electric arc by increasing the intensity of current, given a suitable array of electrodes, the so-called plug effect is achieved. If the subject is of the appropriate thickness, it is melted open in a perforated manner and, when the plasma welding torch is continuously advanced, the molten metal flows around the plasma beam and back together behind it.

A disadvantage of the method described above is that the possible intensity of current, and therefore the welding speed, is limited by the life of the electrodes. This results in high thermal stress on the component and broad thermal impact zones, as well as considerable lag in the subject.

The technical options for further increasing welding speed have been essentially exhausted. In addition to the resulting economic consequences, this means that in the future it will not be possible to substantially lower the limits currently reached in terms of section energy, lag, and the adverse effects on properties of a relatively broad thermal impact zone. This is especially disadvantageous in that the inherent potential of modern, high-strength materials, whose properties can only be attained with specific thermal treatments, are largely underutilized at the current level of development of conventional welding methods.

Another disadvantage of conventional plasma jet welding methods lies in the limited accessibility of and opportunity to observe the welding site, due to the relatively large jet diameter and the small distance from the subject (about 5 mm).

The object of the invention is to provide a new method for plasma jet welding in which the disadvantages of the state of the art are avoided.

According to the invention, a free radio frequency- rf-) induced plasma beam is used, which is generated during a hybrid welding torch process by using the following steps:

- generation of a stationary high-pressure plasma, referred to in the following as pilot plasma, by igniting a first process gas with a pilot plasma welding torch;
- introduction of the pilot plasma into an rf-transparent working tube including a gas inflow and a gas outflow opening, with the working tube being wrapped in a coupling coil;
- introduction of a second process gas into the rf-transparent tube at a pressure of $p \geqq 1$ bar, with the second process gas being introduced into the tube in such a way that it exhibits a tangential flow component in the tube;
- generation of an rf-plasma in the rf-transparent tube by electrode-free ignition of the gas mixture comprising the pilot plasma and the second process gas; and
- generation of a plasma beam by introduction of the rf plasma into a working space through a metal expansion jet arranged at the gas outflow opening of the tube.

In this process, the ignition of the gas mixture takes place especially by absorption of electromagnetic radiation in the radio frequency range. However, it is also possible to ignite the gas mixture by absorption of electromagnetic radiation in the microwave range. The incorporation of the radio frequency energy into the gas mixture is accomplished inductively by means of the coupling coil wrapped around the rf-transparent tube. The coupling coil can be configured in such a way so as to ensure optimal incorporation of the electromagnetic energy into the gas mixture.

The pilot plasma can advantageously be generated in a peak current arc discharge or in an electrode-free microwave discharge.

Through the pilot plasma, an already ionized gas is introduced into the rf-transparent tube, where the ionized gas is mixed with the second process gas. As a result of the interaction between the electromagnetic radiation, which is coupled into the tube through coupling coil, and the ionized gas, the ignition threshold for ignition of the gas mixture from the pilot plasma gas and the second process gas is reduced. As a result, an energy-rich plasma is generated into which virtually the entire radio frequency energy can be incorporated.

The rf-transparent tube is advantageously a tube with dielectric properties. In particular, a tube made of $SiO_2$ or $Al_2O_3$, both in pure form and without dopant, is used as the rf-transparent tube.

Especially advantageous plasma properties result from the plasma jet welding method of the invention. For example, the specific enthalpy of the rf plasma and the related enthalpy flow density of the rf plasma are increased. Consequently, the plasma temperature of the rf plasma and of the plasma beam is also increased. This leads to advantages over the plasma jet welding methods known in the art with respect to increased welding speed and lower weld seam costs. Thus, the plasma jet welding method of the invention provides a welding method that offers considerable economic and application-related advantages while at the same allowing for a wide range of application for the welding method.

The properties of the plasma beam are also improved in terms of reduced diameter and reduced beam angle divergence. In addition, the cylindrically symmetrical plasma beam expands in parallel form in the method of the invention, which reduces the effects of changing the distance between the welding torch and the subject on the fusion shape of the plasma beam in the subject. Another advantage is the improved accessibility to the plasma beam, because it allows for a greater possible distance between the welding torch and the subject. Consequently, distances of 30 mm to 100 mm between the welding torch and the subject, at a plasma beam diameter of 1 mm to 3 mm on the subject, can be achieved with the method of the invention. Thus, power densities above $1.5\times10^5$ W/cm$^2$ can be generated.

The tangential introduction of the second process gas supports the generation, according to the invention, of a plasma beam with a small beam angle divergence. Due to the radial acceleration caused by the tangential introduction of the second process gas, which is further amplified by the cross-sectional narrowing of the expansion jet in the direction of the jet opening, the unevenly accelerated free charged particles move on increasingly narrow spiral paths in the direction of the expansion jet opening, which causes the centripetal acceleration of the charged particles to increase. The charged particles retain this movement, even after exiting the expansion jet and entering the working space. As there is no local charge neutrality, due to variations in ion and electron mobility, the plasma beam is induced in an axially oriented magnetic field, which leads to a curtailment in the flow of the plasma once it exits the jet.

Another advantage of the method of the invention is that the plasma beam of the invention can be generated by means of cost-effective and robust radio frequency systems, such as resonant circuit systems with a frequency of approx. 300 kHz in the typical UHF range (approx. 1–150 MHz).

In the plasma jet welding method of the invention, energy efficiency is also increased in comparison to conventional plasma jet welding systems. As a result, it is possible to generate radio frequency-induced plasmas in which power utilization is greater than 90%. This leads to energy efficiency that is 1.5 times greater than that of welding methods involving high-performance diodes and 20 times higher than that of laser welding methods.

Through the appropriate choice of process-capable gases or gas mixtures, it is possible to increase the specific enthalpy of the plasma in conjunction with improved heat transfer between the plasma and the subject. In the plasma jet welding method of the invention, it is also possible to use a broader spectrum of process gases than is possible with known plasma jet welding methods.

In an advantageous embodiment of the invention, it is possible to add powder to the second process gas before it enters the inductive coupling segment, i.e., before it enters the rf-transparent working tube. This makes it possible, for example, to apply the method of the invention as a powder application welding method. Of course, it is also possible to add powder to the plasma beam after it has exited the expansion jet.

Another advantage of the plasma jet welding method of the invention is that the thermal impact zone of the plasma beam on the subject is considerably reduced, which results in reduced heat incorporation, reduced subject lag, and a reduction in damage to the material. Furthermore, error-free welding, in terms of smaller edge notches and a lesser porosity of the weld seam, can be achieved with the plasma jet welding method of the invention.

In an advantageous embodiment of the invention, the second process gas is introduced into the inductive coupling zone in such a way that, by means of one or more jets, for example, the second process gas flowing into the tube exhibits a tangential axial flow component oriented toward the gas outflow opening of the tube.

In another advantage embodiment of the invention, the metal expansion jet, as viewed in the flow direction of the plasma, features a convergent inlet on the plasma side and a free or divergent outlet on the plasma beam side. This increases the flow velocity of the charged particles of the plasma from the convergent inlet to the divergent outlet.

It is also possible to improve the properties of the plasma beam in terms of reducing beam angle divergence. In addition, beam diameter can be limited by means of the opening cross-sections of the expansion jet. Due to the high temperatures of the plasma, the metal expansion jets can be cooled in an advantageous embodiment of the invention.

It is also possible, given suitable pressure conditions between the pressure in the working space and the pressure in the interior of the rf-transparent tube, and provided that the outflow opening of the expansion jet is suitably dimensioned and the inflow area and the outflow area of the expansion jet are suitably designed, to obtain a freely expanding plasma beam that flows into the working space at supersonic speed.

Other objects, advantages and novel features of the present invention will become apparent from the following detailed description of the invention when considered in conjunction with the accompanying drawings.

BRIEF DESCRIPTION OF THE DRAWINGS

The single FIGURE depicts a possible embodiment for execution of the method of the invention.

DETAILED DESCRIPTION OF THE DRAWING FIGURE

A first process gas (not depicted), such as nitrogen, is supplied to a pilot plasma welding torch 1. In this pilot plasma welding torch 1, a generated pilot plasma 2 is fed into an rf-transparent working tube 3. The working tube 3 features a gas inflow opening 4 and a gas outflow opening 5. In addition to the pilot plasma 2, a second process gas 6 is introduced through the gas inflow opening 4 into the working tube 3. The introduction of the second process gas 6 is such that the second process gas 6 exhibits a tangential axial flow component (not depicted) oriented toward the gas outflow opening 5.

The working tube 3 is wrapped in a coupling coil 13, to which energy is supplied by means of a radio frequency system (not depicted). By absorption of the radio energy in the area 14 in which the working tube 3 is wrapped in the coupling coil 13, an rf plasma 7 is ignited.

A metal expansion jet 10 is secured to the gas outflow opening 5 of the working tube 3. The expansion jet 10 features a convergent inlet 11 on its lower side, i.e., on the side facing away from the rf plasma 7. As a result of this contraction, the charged particles in the plasma 7 are increasingly accelerated toward the outflow opening 15. The rf plasma 7 then passes as a plasma beam 8 through the outflow opening 15 of the expansion jet 10 and into the working space 9. In this depiction, the outflow 12 of the expansion jet 10 is depicted as a divergent outlet. However, any other form of outlet, such as a free outlet, is possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for plasma jet welding by means of a free radio frequency-induced plasma beam, which is generated by the steps of:

generating of a stationary high-pressure plasma by igniting a first process gas in a pilot plasma welding torch and introducing of the plasma gas into an rf-transparent working tube including a gas inflow opening and a gas outflow opening, with the rf-transparent working tube being wrapped in a coupling coil, introducing of a second process gas into the rf-transparent tube at a pressure of $p \geqq 1$ bar, with the second process gas being introduced into the rf-transparent tube through the gas inflow opening in such a way that it exhibits a tangential flow component, generating of an rf-plasma in the rf-transparent tube by electrode-free ignition of the gas mixture; and generating a plasma beam by introducing the rf plasma into a working space through a metal expansion jet arranged at the gas outflow opening of the tube.

2. The method according to claim 1, wherein the second process gas is introduced into the rf-transparent tube in such a way that the second process gas flowing into the tube exhibits a tangential axial flow component oriented toward the gas outflow opening of the tube.

3. The method according to claim 1, wherein the metal expansion jet, as viewed in the flow direction of the rf plasma, includes a convergent inlet on the plasma side and a free or divergent outlet on the plasma beam side.

4. The method according to claim 3, wherein the metal expansion jet is cooled.

5. The method according to claim 1, wherein radio waves in the frequency range of 150 kHz to 150 MHz are used for rf plasma generation resulting from inductive coupling.

6. The method according to claim 1, wherein a tube with dielectric properties, comprised of $SiO_2$ or $Al_2O_3$, in pure form and without dopant, is used as the rf-transparent tube.

7. The method according to claim 1, wherein powder is added to the second process gas (6) before entry into the rf-transparent.

8. The method according to claim 1, wherein the stationary high-pressure plasma is generated by means of one of an arc discharge and electrode-free microwave discharges.

9. The method according to claim 2, wherein the metal expansion jet, as viewed in the flow direction of the rf plasma, includes a convergent inlet on the plasma side and a free or divergent outlet on the plasma beam side.

10. The method according to claim 2, wherein radio waves in the frequency range of 150 kHz to 150 MHz are used for rf plasma generation resulting from inductive coupling.

11. The method according to claim 3, wherein radio waves in the frequency range of 150 kHz to 150 MHz are used for rf plasma generation resulting from inductive coupling.

12. The method according to claim 2, wherein a tube with dielectric properties, comprised of $SiO_2$ or $Al_2O_3$, in pure form and without dopant, is used as the rf-transparent tube.

13. The method according to claim 3, wherein a tube with dielectric properties, comprised of $SiO_2$ or $Al_2O_3$, in pure form and without dopant, is used as the rf-transparent tube.

14. The method according to claim 5, wherein a tube with dielectric properties, comprised of $SiO_2$ or $Al_2O_3$, in pure form and without dopant, is used as the rf-transparent tube.

15. The method according to claim 2, wherein powder is added to the second process gas (6) before entry into the rf-transparent.

16. The method according to claim 3, wherein powder is added to the second process gas (6) before entry into the rf-transparent.

17. The method according to claim 5, wherein powder is added to the second process gas (6) before entry into the rf-transparent.

18. The method according to claim 6, wherein powder is added to the second process gas (6) before entry into the rf-transparent.

19. The method according to claim 2, wherein the stationary high-pressure plasma is generated by means of one of an arc discharge and electrode-free microwave discharges.

20. The method according to claim 3, wherein the stationary high-pressure plasma is generated by means of one of an arc discharge and electrode-free microwave discharges.

* * * * *